(12) United States Patent
Lenk

(10) Patent No.: US 6,222,352 B1
(45) Date of Patent: Apr. 24, 2001

(54) MULTIPLE VOLTAGE OUTPUT BUCK CONVERTER WITH A SINGLE INDUCTOR

(75) Inventor: Ronald J. Lenk, Sunnyvale, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/511,091

(22) Filed: Feb. 23, 2000

Related U.S. Application Data
(60) Provisional application No. 60/132,820, filed on May 6, 1999.

(51) Int. Cl.[7] ............................................. G05F 1/577
(52) U.S. Cl. ................................... 323/267; 323/282
(58) Field of Search .............................. 363/62; 323/239, 323/224, 282, 267

(56) References Cited

U.S. PATENT DOCUMENTS

| | | | |
|---|---|---|---|
| 4,801,859 | * 1/1989 | Dishner | 323/224 |
| 5,444,356 | 8/1995 | Reynolds et al. | 323/282 |
| 5,479,089 | * 12/1995 | Lee | 323/283 |
| 5,552,695 | 9/1996 | Schwartz | 323/271 |
| 5,617,015 | 4/1997 | Goder et al. | 323/282 |
| 5,654,881 | 8/1997 | Albrecht et al. | 363/25 |
| 5,886,508 | * 3/1999 | Jutras | 323/267 |
| 5,920,475 | * 7/1999 | Boylan et al. | 363/127 |
| 6,031,743 | * 2/2000 | Carpenter et al. | 363/65 |
| 6,037,755 | * 3/2000 | Mao et al. | 323/222 |

* cited by examiner

Primary Examiner—Adolf Deneke Berhane
(74) Attorney, Agent, or Firm—Mikio Ishimaru

(57) ABSTRACT

A low cost, multiple output buck converter is provided using a single inductor, a single pulse width modulator integrated circuit, and two MOSFETs plus one additional MOSFET and capacitor for each voltage output.

21 Claims, 4 Drawing Sheets

MULTIPLE VOLTAGE OUTPUT BUCK CONVERTER WITH A SINGLE INDUCTOR

CROSS REFERENCE TO RELATED APPLICATION(S)

This application claims the benefit of U.S. Provisional Patent Application No. 60/132,820 filed on May 6, 1999 still pending, which is incorporated herein by reference thereto.

TECHNICAL FIELD

The present invention relates generally to buck converters and more particularly to DC—DC converters for desktop and portable computers.

BACKGROUND ART

In the past, non-isolated, step-down, direct current converters using buck topology were used because they included only a single inductor for their magnetics and no transformer. Using the simplest possible magnetics is important because the cost of the magnetics rises rapidly as additional windings are added. The cost not only increases due to manufacturing cost but also due to testing cost. Further, more complex magnetics increase the chances of errors in construction, which may lead to failures of the converter. However, these buck converters were capable of producing only a single output voltage. If more than one output voltage was required, either a linear regulator at the output of the buck converter, a second buck converter at the output of the first converter, or a parallel buck converter was required. Using a linear regulator, although low cost, involves very poor efficiency and concomitant heat problems. Use of a second buck converter or a parallel buck converter both involve adding one or more additional complete converters, with all of their additional magnetics, controller integrated circuits, etc. Further, the series connection of two frequency converters may halve the efficiency of the system.

Many systems require multiple low voltage power buses for operation. In particular, computer motherboards need large currents at, for example, both 3.3 volts and 2.0 volts. A conventional approach for generating these two voltages is to have a separate buck converter for each output. Each converter involves a control integrated circuit, two MOSFETs (for synchronous conversion), an inductor, one or more output capacitors, and a variety of small signal components. These numerous parts, and inductors in particular, make power conversion very expensive. A simpler and less costly solution has long been sought.

DISCLOSURE OF THE INVENTION

The present invention provides a low-cost, multiple output buck converter using a single inductor, a single pulse width modulator integrated circuit, two MOSFETs plus one additional MOSFET, and one or more capacitors for each voltage output.

The present invention further provides a low-cost, multiple output buck converter which eliminates the need for an inductor, a pulse width modulator integrated circuit and two MOSFETs, plus one MOSFET for each output.

The present invention further provides a multiple output buck converter which may be used wherever multiple output voltage outputs are required to be derived from a single higher voltage input.

The present invention further provides a single, single winding inductor to generate multiple buck outputs, forming a single, multi-output buck converter with each output regulator.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
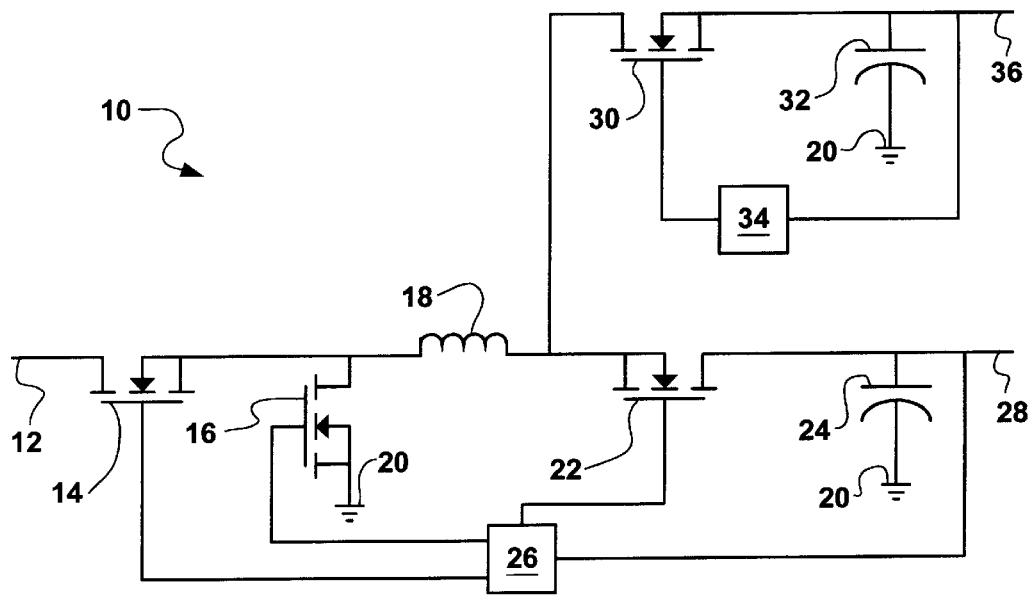
FIG. 1 is a basic multiple output buck converter of the present invention in a dual output configuration.

Referring now to FIG. 1, therein is shown a basic multiple output, single inductor, buck converter 10 of the present invention in a dual output configuration. The converter 10 has an input 12 connected to an input MOSFET 14 which is connected to a regulating MOSFET 16 and an inductor 18.

The MOSFET 16 is connected through to a ground 20 and the inductor 18 is connected to a first MOSFET 22. The MOSFET 22 is connected by a charge storage device, such as a capacitor 24, to the ground 20. The MOSFET 22 is further connected to a first voltage output 28. The gate of the MOSFET 22 is connected to a pulse width modulator 26, which is further connected to the gates of the MOSFETs 14 and 16.

To obtain the second output voltage, a second MOSFET 30 is connected between the inductor 18 and the MOSFET 22. The MOSFET 30 is connected through a capacitor 32 to the ground 20 and to a second voltage output 36. The second voltage output 36 is connected to a pulse width modulator 34, which controls the MOSFET 30. Although different pulse width modulators are shown, it would be evident to those skilled in the art that they could be one integrated circuit on a single semiconductor chip.

Figure 2:
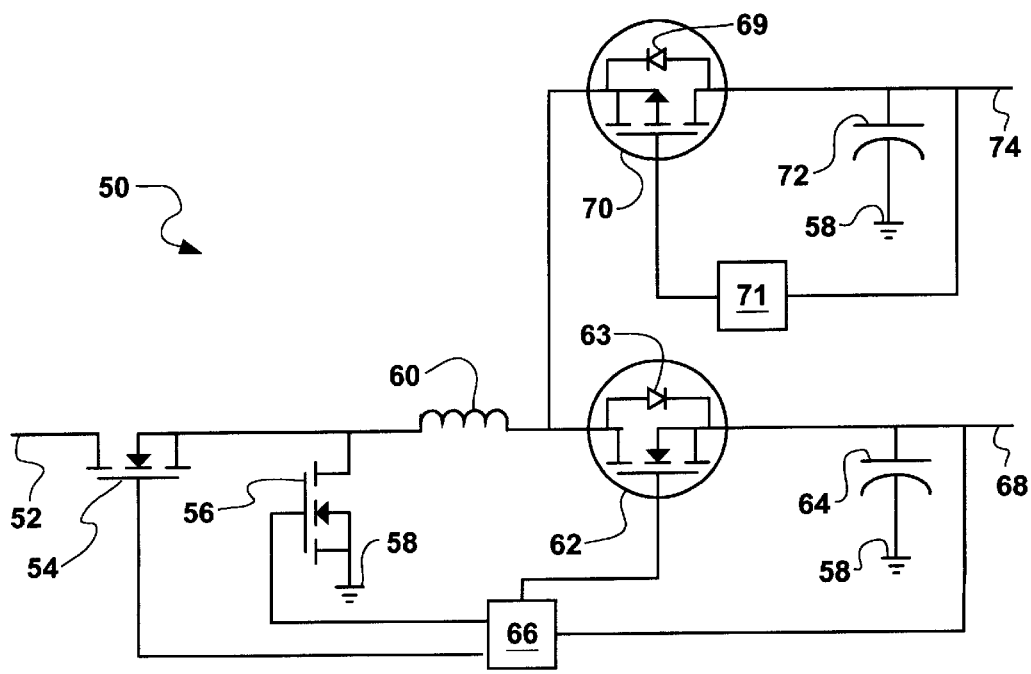
FIG. 2 is a multiple output buck converter of the present invention in a dual output configuration.

Referring now to FIG. 2, therein is shown a multiple output, single inductor, buck converter 50 of the present invention in a dual output configuration. The buck converter 50 has a voltage input 52 connected to an input MOSFET 54. The MOSFET 54 is connected to a regulating MOSFET 56 which is connected to a ground 58. The MOSFETs 54 and 56 are connected to an inductor 60 which is connected through an first MOSFET 62 having a diode 63, which is connected through a first capacitor 64 to the ground 58. The MOSFET 62 is further connected to a pulse width modulator 66, which is connected to the gates of MOSFETs 54 and 56. The output of the first MOSFET 62 is further connected to a first voltage output 68.

For the second output, the inductor 60 is connected to a second MOSFET 70 having a body diode 69 and having its output connected through a second capacitor 72 to the ground 58 and to a second voltage output 74. The second voltage output 74 is connected to a pulse width modulator 71, which is connected to the gate of the MOSFET 70.

Figure 3:
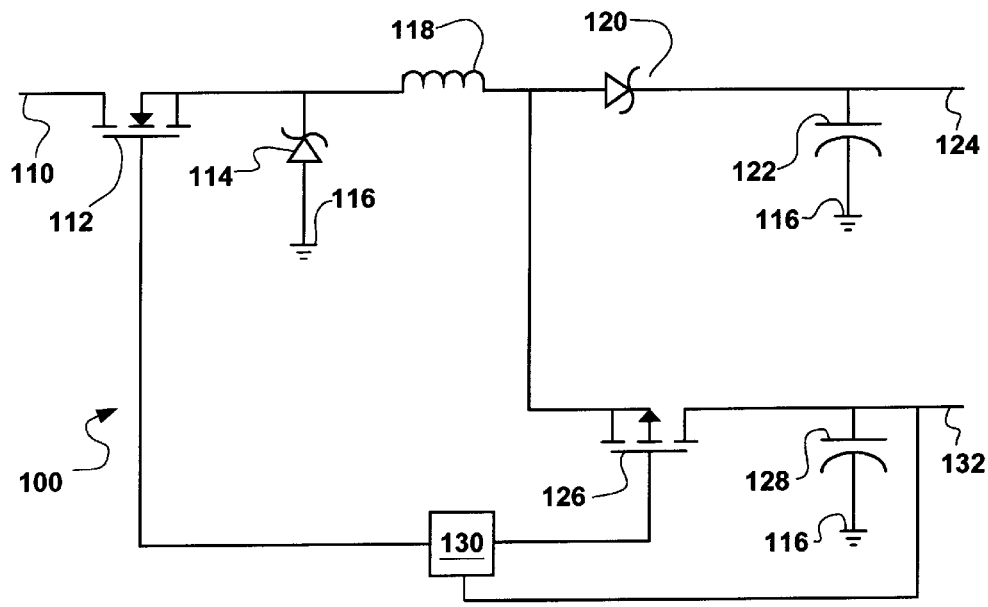
FIG. 3 is a dual output buck converter of the present invention simplified to illustrate the control and operation thereof.

Referring now to FIG. 3, therein is shown a simplified representation of a dual output, single inductor, buck converter 100. A voltage input 110 connected to an input MOSFET 112 which is connected to a diode 114 which is connected to a ground 116. The MOSFET 112 is further connected to an inductor 118 which is connected to a diode 120 which is connected through a capacitor 122 to the ground 116 and to a first voltage output 124.

For the second output, the inductor 118 is connected to a MOSFET 126, which is connected by a capacitor 128 to the ground 116, and to a second voltage output 132. The second voltage output 132 is connected to a pulse width modulator 130, which is connected to the gates of the MOSFETs 112 and 126. The buck converter 100 is set up to provide a higher voltage output at the first voltage output 124 than the second voltage output 132.

Figure 4:
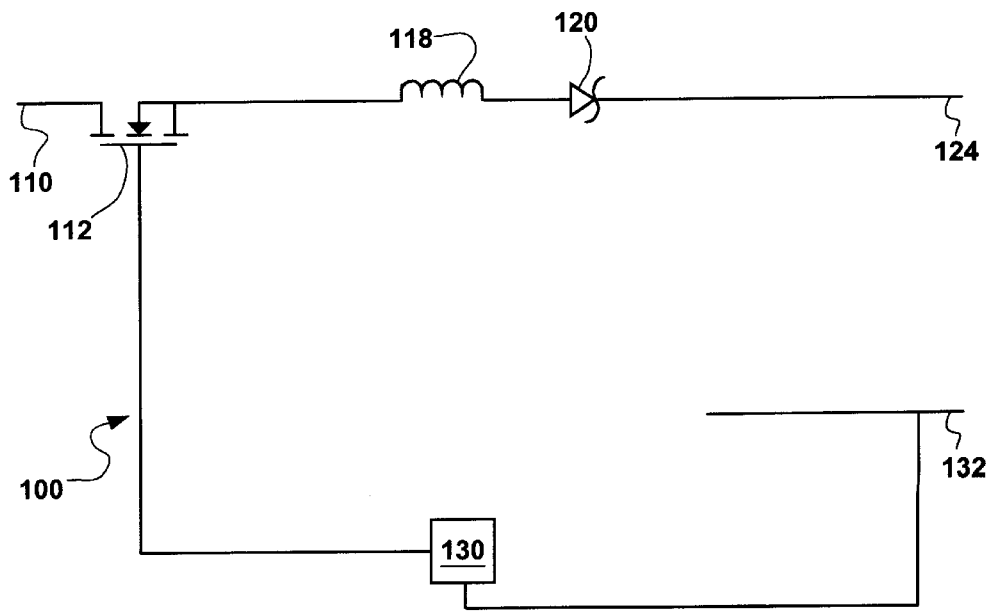
FIG. 4 is the buck converter of FIG. 3 showing the operative components in a first state.

Referring now to FIG. 4, therein is shown the operative components of the buck converter 100 in a first state I. The same numbers as used in FIG. 3 are used in FIG. 4. Thus, therein are shown the voltage input 110, the MOSFET 112, the inductor 118, the diode 120, and the first voltage output 124.

Figure 5:
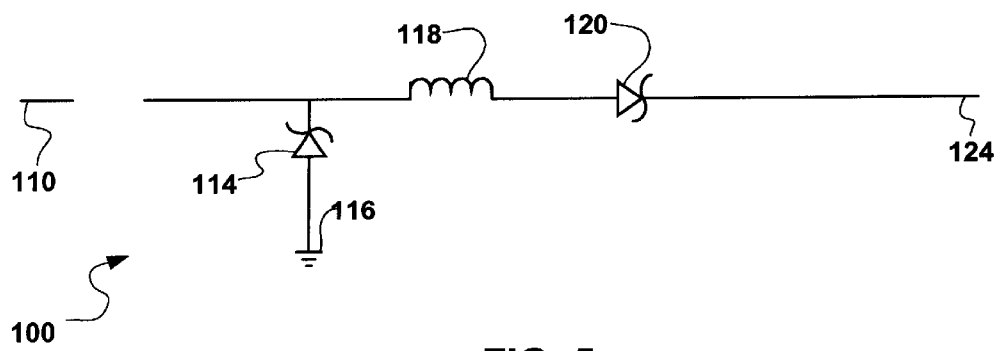
FIG. 5 is the buck converter of FIG. 3 showing the operative components in a second state.

Referring now to FIG. 5, therein is shown the buck converter 100 in a second state of operation. The numbers are the same as used in FIG. 3 and include the diode 114 connected to the ground 116, the inductor 118, the diode 120, and the first voltage output 124.

Figure 6:
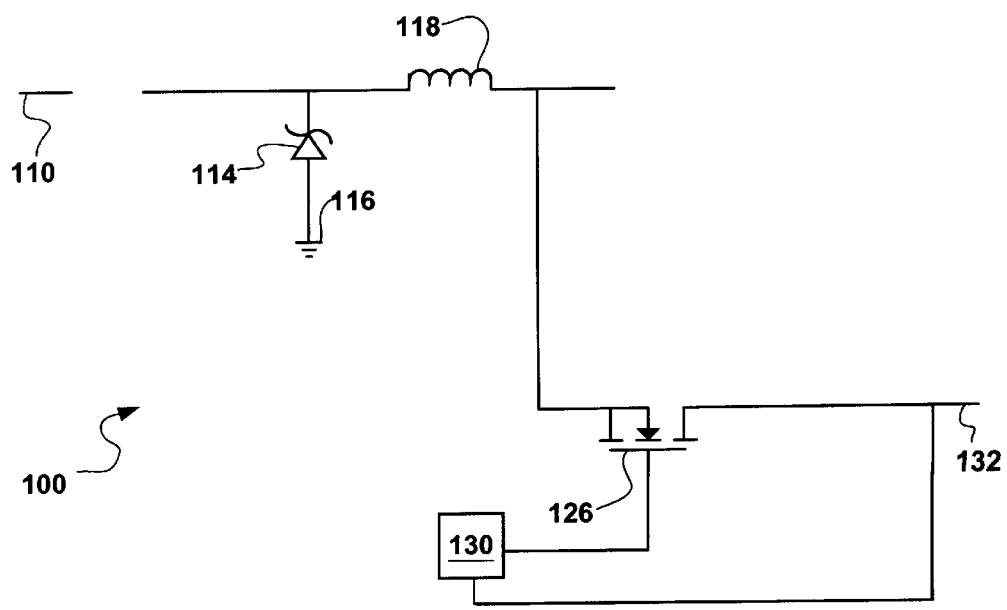
FIG. 6 is the buck converter of FIG. 3 showing the operative components in a third state.

Referring now to FIG. 6, therein is shown the buck converter 100 in a third state of operation. The numbers are the same as used in FIG. 3 and include the diode 114 connected to the ground 116, the inductor 118, the MOSFET 126, and the second voltage output 132.

Figure 7:
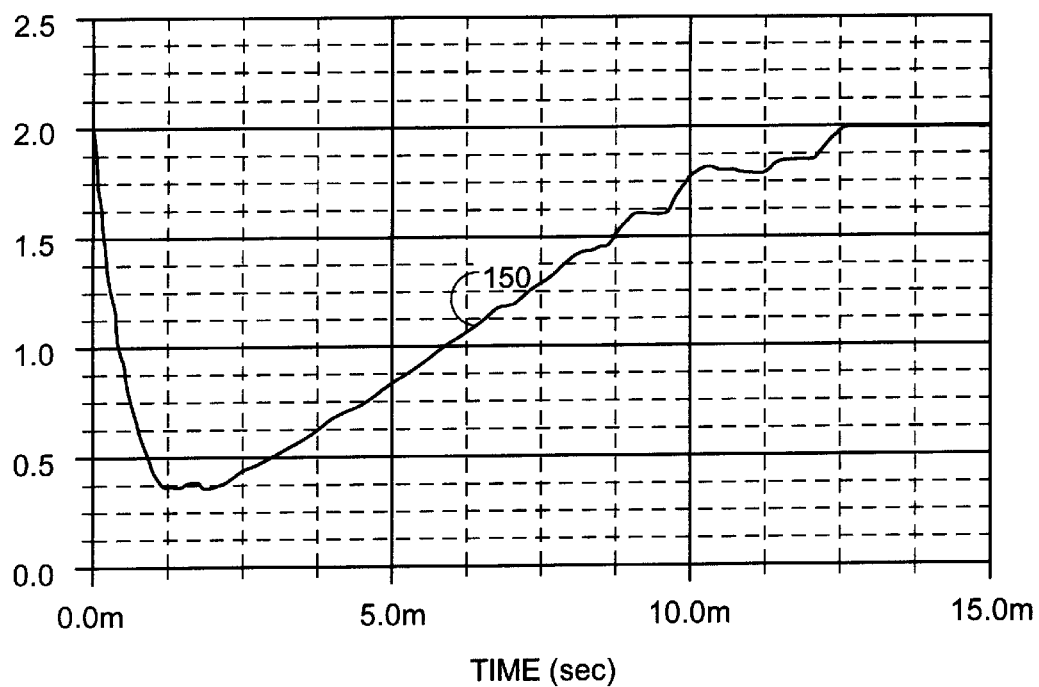
FIG. 7 is a switching simulation showing one output of the buck converter of the present invention.

Referring now to FIG. 7, therein is shown a switching simulation showing a two-volt output waveform 150.

Figure 8:
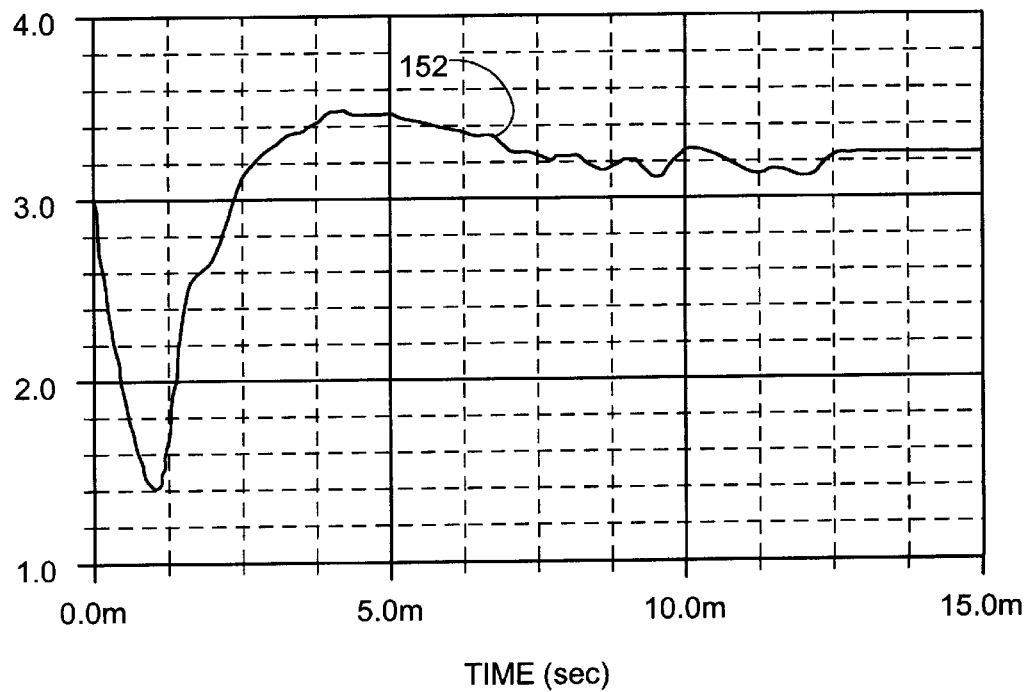
FIG. 8 is another output of the buck converter of the present invention.

Referring now to FIG. 8, therein is shown a switching simulation showing a three-volt output waveform 152.

In operation, the multiple output buck converters 10, 50, and 100 operate as normal, single input buck converters for one of the voltage outputs.

In the configuration of FIG. 1, the pulse width modulator 26 turns the MOSFETs 14 and 16 on and off at a determinate duty cycle to accomplish synchronous rectification. The MOSFET 16 acts as a unidirectional switch for maintaining current through the inductor 18. The input into the inductor 18, which is for the moment assumed to have a continuous current, is fed into the various output capacitors 24 and 32 depending on the state of the MOSFETs 22 and 30 disposed between the inductor 18 and the output capacitors 24 and 32, respectively. The first voltage output 28 uses the MOSFET 22 to control the flow of current from the inductor 18 to the output capacitor 24. The second voltage output 36 uses the pulse width modulator 26 and the MOSFET 30 to control the flow of current from the inductor 18 to the output capacitor 32.

The action of the buck converter 10 is as follows. First, the MOSFET 22 turns on, allowing the inductor current to flow to the first voltage output 28. Then the MOSFET 22 turns off, and the MOSFET 30 turns on allowing current flow to the second voltage output 36 under the control of the pulse width modulator 34.

For the configuration of FIG. 2, the pulse width modulator 66 turns the MOSFETs 54 and 56 on and off at a determinate duty cycle to accomplish synchronous rectification. The MOSFET 56 acts as a unidirectional switch for maintaining current through the inductor 60. The input into the inductor 60, which is for the moment assumed to have a continuous current, is fed into the various output capacitors 64 and 72 depending on the state of the MOSFETs 62 and 70 disposed between the inductor 60 and the output capacitors 64 and 72, respectively. The first voltage output 68 has the higher voltage. This higher voltage output 68 uses the MOSFET 62 to control the flow of current from the inductor 60 to the output capacitor 64. When the MOSFET 62 is on, current flows to the output 68. When the MOSFET 62 is off, inductor current does not flow to the first voltage output 68 unless the voltage at the inductor node is higher than the output 68 voltage plus the body diode 63 drop in the MOSFET 62.

The action of the buck converter 50 is as follows. First, the MOSFET 62 is turned on by the pulse width modulator 66 allowing current flow to the output 68. Then the MOSFET 62 turns off, and the body diode 63 in the MOSFET 62 conducts. Then the MOSFET 70 attached to the second voltage output 74 turns on and diverts the inductor 60 current away from the first voltage output 68 and into the second voltage output 74. The MOSFET 70 is turned off by the pulse width modulator 71, completing one cycle.

The front end MOSFETs 54 and 56 regulate the first voltage output 68 by controlling its duty cycle. The second voltage output 74 is controlled by controlling the on time at its MOSFET 70. Any current that is not needed to regulate the second voltage output at 74 is diverted into the first voltage output 68 because of the diode voltage drop.

It should be noted first, by the addition of additional MOSFETs, that a single control circuit can be designed to run multiple outputs with only one additional MOSFET per additional output. Second, only a single, single winding inductor is used. Third, efficiency is comparable to, or better than, multiple converters because the secondary MOSFETs are fed from a current source.

In a first alternative mode, the dioded MOSFETs, such as MOSFETs 62 and 70, would have discrete Schottky diodes in parallel with their body diodes to avoid reverse recovery time problems.

In a second alternative mode, the MOSFET 62, which is n-channel as shown, would be replaced with a p-channel MOSFET and a diode.

In a third alternative mode, additional outputs could be generated by using additional MOSFETs and capacitors as done with the MOSFET 70 and the capacitor 72.

In a fourth alternative mode, the input converter need not be synchronous.

In a fifth alternative mode, the output voltages switch either synchronously or asynchronously with the front end MOSFETs.

In FIG. 3, therein is shown is a dual output buck converter 100 of the present invention which is simplified to illustrate the control and operation thereof.

In the first state, as shown in FIG. 4, the MOSFET 112 is on and the MOSFET 126 is off. In this state I the voltage into input 110 passes through the MOSFET 112 into the inductor 118 through the diode 120 to the output 124.

In the second state, as shown in FIG. 5, the MOSFET 112 is off and the MOSFET 126 is off. In this state IIA, the diode 114 maintains the current through the inductor 118 and through the diode 120 to the output 124.

In the third state IIB, as shown in FIG. 6, the MOSFET 112 is off, and the MOSFET 126 is on. This cuts off the diode 120 and causes the configuration to be such that the diode 114 acts as a unidirectional switch to maintain the current through the inductor 118 and through the MOSFET 126 to the output 132.

The duty cycle for the various pulse width modulators is calculated based on the above states and is based on balancing the volt-seconds across the inductor 118. Assuming the MOSFETs and the inductor 118 have no resistance and the diode 120 has the forward voltage of $V_f$ which is independent of current:

$$[V_{in}-(V_{outI}+V_f)]t_I=(V_{outI}+2V_f)t_{IIA}+(V_{outII}+V_f)t_{IIB} \qquad \text{Eq. 1}$$

where:

$V_{in}$=the input voltage;
$V_{outI}$=the first voltage output;
$V_{outII}$=second voltage output;
$V_f$=the diode forward voltage;
$V_{outII}$=the second output voltage;
$t_I$=on time of State I;
$t_{IIA}$=on time of state IIA;
$t_{IIB}$=on time of state IIB;

The second equation expresses the fact that there are a total of three states making up the period T.

$$t_I+t_{IIA}+t_{IIB}=T \qquad \text{Eq. 2}$$

Equation 3 is based on the inductor current flow either to $V_{outI}$ or $V_{outII}$; and, with the approximation that the inductor is very large, the inductor's current is constant over a period so the average current each output receives depends on the state time.

Conserving charge:

$$t_{IIB}*I_L=I_{II}*T; (t_I+t_{IIA})I_L=I_IT \qquad \text{Eq. 3}$$

where:

$I_L$=inductor current;
$I_I$=DC output current of $V_{out(I)}$
$I_{II}$=DC output current of $V_{out(II)}$ Manipulating Equation 3 as follows:

$$\frac{t_{IIB}I_L}{(t_I+t_{IIA})I_L}=\frac{I_{II}CT}{I_I T} \qquad \text{Eq. 4}$$

$$\frac{t_{IIB}}{t_I+t_{IIA}}=\frac{I_{II}}{I_L} \qquad \text{Eq. 5}$$

$$t_I+t_{IIA}=T-t_{IIB} \qquad \text{Eq. 6}$$

$$\frac{t_{IIB}}{T-t_{IIB}}=\frac{I_{II}}{I_I} \qquad \text{Eq. 7}$$

$$\frac{T-t_{IIB}}{t_{IIB}}=\frac{I_I}{I_{II}}=\frac{T}{t_{IIB}}-1 \qquad \text{Eq. 8}$$

$$\frac{T}{t_{IIB}}=1+\frac{I_I}{I_{II}} \qquad \text{Eq. 9}$$

This produces the equation:

$$DC_{IIB}\equiv\frac{t_{IIB}}{T}=\frac{1}{1+\frac{I_I}{I_{II}}}=\frac{I_{II}}{I_I+I_{II}} \qquad \text{Eq. 10}$$

where $DC_{IIB}$=Duty Cycle of State IIB

This equation can now be used to eliminate $t_{IIB}$ from equations 1 and 2:

$$[V_{in}-(V_{outI}+V_f)]t_I=(V_{outI}+2V_f)t_{IIA}+(V_{outII}+V_f)\frac{I_{II}}{I_I+I_{II}}T \qquad \text{Eq. 11}$$

$$t_I+t_{IIA}+\frac{I_{II}}{I_I+I_{II}}T=T \qquad \text{Eq. 12}$$

Eq. 12 can be solved for:

$$t_{IIA}=\left(1-\frac{I_{II}}{I_I+I_{II}}\right)T-t_I=\frac{I_I}{I_I+II_I}T-t_I \qquad \text{Eq. 13}$$

And substituting into Eq. 11:

$$[V_{in}-(V_{outI}+V_f)]t_I= \qquad \text{Eq. 14}$$
$$(V_{outI}+2V_f)\left[\frac{I_I}{I_I+I_{II}}T-t_I\right]+(V_{outII}+V_f)\frac{I_{II}}{I_I+I_{II}}T$$

The solution for duty cycle is:

$$DC_I\equiv\frac{t_I}{T}=\frac{(V_{outI}+2V_f)I_I+(V_{outII}+V_f)I_{II}}{(I_I+I_{II})(V_{in}+V_f)} \qquad \text{Eq. 15}$$

It should be noted that as $I_{II}$ approaches 0 (zero), $DC_{IIB}$ approaches 0 and $DC_I$ approaches the normal duty cycle of a single output buck converter:

$$DC_I\rightarrow\frac{V_{outI}+2V_f}{V_{in}+V_f} \qquad \text{Eq. 16}$$

which is the normal duty cycle of a single output buck converter.

Another interesting limit is obtained when $V_f$ approaches 0 (zero):

$$DC_I\rightarrow\frac{V_{outI}I_I+V_{outII}I_{II}}{(I_I+I_{II})V_{in}}=\frac{P_{out}}{I_{out}V_{in}} \qquad \text{Eq. 17}$$

The above is a generalization of the following equation for a buck converter with a single output:

$$DC=\frac{V_{out}}{V_{in}} \qquad \text{Eq. 18}$$

The duty cycle for a multi-output buck converter of the present invention will have a duty cycle of its output current divided by the total output current or:

$$DC_x=\frac{I_x}{\sum_x I_{out}} \qquad \text{Eq. 19}$$

And the duty cycle will be:

$$\frac{P_{out}}{\sum_{x}(I_{out}V_{in})} \quad \text{Eq. 20}$$

As shown in FIGS. 7 and 8 for two and three volts respectively, steady output voltages can be obtained.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A buck converter comprising:
   a voltage input;
   a first voltage output;
   a second voltage output;
   a single inductor;
   input switching means connected to the voltage input for controlling the time the first voltage input is connected to the single inductor;
   unidirectional switching means connected between the input switching means and the single inductor for maintaining current through the single inductor;
   a first voltage output circuit connected to the single inductor and to the first voltage output;
   a pulse width modulator connected to the input switching means, the first voltage output circuit, and the second voltage output; and
   a second voltage output circuit connected to the single inductor and to the second voltage output, said second voltage output circuit connected to the pulse width modulator.

2. The buck converter as claimed in claim 1 wherein the first voltage output circuit includes:
   first switching means connected to the pulse width modulator for controlling the time the single inductor is connected to the first voltage output; and
   first charge storage means connected between the first switching means and the first voltage output for storing charge therebetween.

3. The buck converter as claimed in claim 1 wherein the second voltage output circuit includes:
   second charge storage means connected between the single inductor and the second voltage output to store the charge therebetween; and
   second unidirectional switching means disposed between the single inductor and the second charge storage means for maintaining the charge on the second charge storage means.

4. The buck converter as claimed in claim 1 wherein the second voltage output circuit includes:
   a second pulse width modulator;
   second switching means connected to the second pulse width modulator for controlling the time the single inductor is connected to the second voltage output; and
   second charge storage means connected between the second switching means and the second voltage output to control the charge therebetween.

5. The buck converter as claimed in claim 4 wherein:
   the first voltage output circuit includes:
      first switching means connected to the pulse width modulator for controlling the time the single inductor is connected to the first voltage output,
      the first switching means including first unidirectional switching means for allowing current through the first switching means, and
      the second switching means including second unidirectional switching means for allowing current through the second switching means.

6. The buck converter as claimed in claim 1 wherein the pulse width modulator causes the input switching means to operate synchronously with the first voltage output circuit.

7. The buck converter as claimed in claim 1 wherein the pulse width modulator causes the input switching means to operate asynchronously with the first voltage output circuit.

8. A buck converter comprising:
   a voltage input;
   a first voltage output;
   a second voltage output;
   a single inductor;
   input transistor connected to the voltage input for controlling the time the first voltage input is connected to the single inductor;
   diode connected between the input transistor and the single inductor for regulating current through the single inductor;
   a first voltage output circuit connected to the single inductor and to the first voltage output;
   a pulse width modulator connected to the input transistor, the first voltage output circuit, and the second voltage output; and
   a second voltage output circuit connected to the single inductor and to the second voltage output, said second voltage output circuit connected to the pulse width modulator.

9. The buck converter as claimed in claim 8 wherein the first voltage output circuit includes:
   first transistor connected to the pulse width modulator for controlling the time the single inductor is connected to the first voltage output; and
   first charge stored means connected between the first transistor and the first voltage output for storing charge therebetween.

10. The buck converter as claimed in claim 8 wherein the second voltage output circuit includes:
    second capacitor connected between the single inductor and the second voltage output to store the charge therebetween; and
    second diode disposed between the single inductor and the second capacitor for regulating the charge on the second capacitor.

11. The buck converter as claimed in claim 8 wherein the second voltage output circuit includes:
    a second pulse width modulator;
    second transistor connected to the second pulse width modulator for controlling the time the single inductor is connected to the second voltage output; and
    second capacitor connected between the second transistor and the second voltage output to control the charge therebetween.

12. The buck converter as claimed in claim 11 wherein:
    the first voltage output circuit includes:

first transistor connected to the pulse width modulator for controlling the time the single inductor is connected to the first voltage output, the first transistor including first diode for regulating the current across the first transistor, and the second transistor including second diode for regulating the current across the second transistor.

13. The buck converter as claimed in claim 8 wherein the pulse width modulator causes the input transistor to operate synchronously with the first voltage output circuit.

14. The buck converter as claimed in claim 8 wherein the pulse width modulator causes the input transistor to operate asynchronously with the first voltage output circuit.

15. A buck converter comprising:

a voltage input;

a first voltage output;

a ground;

a second voltage output;

a single inductor;

input MOSFET connected to the voltage input for controlling the time the first voltage input is connected to the single inductor;

a pulse width modulator connected to the input MOSFET and the second voltage output;

unidirectional switching means connected between the input MOSFET and the single inductor, the unidirectional switching means connected to the ground for maintaining current through the single inductor;

a first voltage output circuit connected to the single inductor, to the first voltage output, and to the ground; and a second voltage output circuit connected to the single inductor, to the second voltage output, and to the ground, said second voltage output circuit connected to the pulse width modulator.

16. The buck converter as claimed in claim 15 wherein the first voltage output circuit includes:

a first MOSFET connected to the pulse width modulator for controlling the time the single inductor is connected to the first voltage output; and a first capacitor connected between the first MOSFET, the first voltage output for storing charge therebetween, and to the ground.

17. The buck converter as claimed in claim 15 wherein the second voltage output circuit includes:

second capacitor connected between the single inductor, the second voltage output to store the charge therebetween, and the ground; and second diode disposed between the single inductor and the second capacitor for regulating the charge on the second capacitor.

18. The buck converter as claimed in claim 15 wherein the second voltage output circuit includes:

a second pulse width modulator;

second MOSFET connected to the second pulse width modulator for controlling the time the single inductor is connected to the second voltage output; and second capacitor connected between the second MOSFET, the second voltage output to control the charge therebetween, and to the ground.

19. The buck converter as claimed in claim 18 wherein:

the first voltage output circuit includes:

a first MOSFET connected to the pulse width modulator for controlling the time the single inductor is connected to the first voltage output, the first MOSFET including a first diode for regulating the current across the first MOSFET, and the second MOSFET including a second diode for regulating the current across the second MOSFET.

20. The buck converter as claimed in claim 15 wherein the pulse width modulator causes the input transistor to operate synchronously with the first voltage output circuit.

21. The buck converter as claimed in claim 15 wherein the pulse width modulator causes the input transistor to operate asynchronously with the first voltage output circuit.

* * * * *